United States Patent
Ottelli (10) Patent No.: US 10,935,996 B2
(45) Date of Patent: Mar. 2, 2021

(54) MIXER VALVE PROVIDED WITH PRESSURE BALANCER

(71) Applicant: ARTIS S.R.L., Collebeato (IT)

(72) Inventor: Giordano Ottelli, Collebeato (IT)

(73) Assignee: ARTIS S.R.L., Collebeato (IT)

( * ) Notice: Subject to any disclaimer, the term of this patent is extended or adjusted under 35 U.S.C. 154(b) by 48 days.

(21) Appl. No.: 16/482,087

(22) PCT Filed: Jan. 18, 2018

(86) PCT No.: PCT/IB2018/050305
§ 371 (c)(1),
(2) Date: Jul. 30, 2019

(87) PCT Pub. No.: WO2018/142235
PCT Pub. Date: Aug. 9, 2018

(65) Prior Publication Data
US 2020/0249707 A1    Aug. 6, 2020

(30) Foreign Application Priority Data

Feb. 6, 2017   (IT) .......................... UA2017A000725

(51) Int. Cl.
*G05D 23/13*    (2006.01)
(52) U.S. Cl.
CPC ....... *G05D 23/1353* (2013.01); *G05D 23/136* (2013.01)
(58) Field of Classification Search
CPC ............. G05D 23/1353; G05D 23/136; G05D 23/1313; G05D 23/1393; G05D 23/134; F16K 31/002; F16K 11/044
See application file for complete search history.

(56) References Cited

U.S. PATENT DOCUMENTS

| | | | |
|---|---|---|---|
| 5,129,576 A * | 7/1992 | Pullen | G05D 23/1353 137/637.3 |
| 2003/0101510 A1* | 6/2003 | Ottelli | G05D 23/1353 4/675 |
| 2015/0220090 A1* | 8/2015 | Ottelli | G05D 23/1346 236/12.2 |

FOREIGN PATENT DOCUMENTS

| | | | |
|---|---|---|---|
| WO | 2006126222 A1 | 11/2006 | |
| WO | 2007072526 A1 | 6/2007 | |
| WO | WO-2007072526 A1 * | 6/2007 | ........... G05D 23/136 |
| WO | 2014033678 A1 | 3/2014 | |

* cited by examiner

*Primary Examiner* — Emmanuel E Duke
(74) *Attorney, Agent, or Firm* — Volpe Koenig (57) ABSTRACT

A mixer valve of hot and cold water is described, for sanitary fixtures, provided with a pressure balancer of the inlet flows of cold water and hot water. If need be, the valve can also be provided with a temperature regulator and/or a multi-way diverter. The pressure balancer comprises a cylindrical element in which two inlet chambers of cold water and hot water are defined and separated by a movable plunger. When a pressure variation occurs in one of the two inlet flows, the plunger moves correspondingly thus modifying the volume of one of the two chambers, in order to compensate the pressure variation not transmitted to the flows sent to the downstream mixer cartridge. The pressure balancer is coaxial to the other valve components. Advantageously, the movable plunger slides along the longitudinal axis of the valve.

14 Claims, 8 Drawing Sheets

MIXER VALVE PROVIDED WITH PRESSURE BALANCER

FIELD OF INVENTION

The present invention generally pertains to the field of taps and specifically relates to a mixer valve of hot and cold water for sanitary fixtures, provided with a pressure balancer of the flows of cold water and hot water.

STATE OF THE ART

Cartridge mixer valves are known since long time in the tap field, that may be inserted in a tap body, are provided with separate inlets for hot water and cold water and with means for intercepting such inlets, means for regulating the flow rate and means for varying the mixing ratios of the two types of water depending on the temperature of the mixed water to be delivered through an outlet.

Generally, there are mixer valves provided with a thermostatic regulator and valves without such an element.

In valves without thermostatic regulator, the opening and closing of the valve, the flow rate regulation of the supplied mixed water, including the change of mixing ratios of hot and cold water, are achieved manually operating a control lever of the valve itself.

In valves provided with thermostatic regulator, the change of mixing ratios of hot and cold water is automatically carried out by regulating means which keep as much as possible constant the temperature of the supplied mixed water over time.

Commonly, the thermostatic regulator comprises two sets of side holes for the separate inflow of hot water and cold water at different positions along its longitudinal axis. The regulator is coaxially inserted in a corresponding tap body. The cold water and the hot water are separately supplied to the corresponding side holes of the thermostatic regulator through two annular chambers defined between the thermostatic regulator and the tap body. The hot and cold water mixing takes place in the thermostatic regulator, at an inner mixing chamber which opens outwards through an outlet hole provided at the bottom of the tap body.

Generally, the thermostatic regulators comprise a heat-sensitive sensor, for example a wax sensor or a metal bulb, proportionally expanding according to the temperature change of water passing in the mixing chamber so as to control the axial movement of a regulator of flow rates of hot water and cold water supplied through the side holes of the thermostatic regulator itself, and accordingly to feedback regulate the temperature of mixed water outgoing from the tap.

One of the drawbacks of traditional solutions is that the heat sensor operates properly only if hot water and cold water are homogeneously mixed in the inner mixing chamber in which the sensor operates and the pressure amount of the two flow rates of water (hot and cold) incoming in the valve considerably affects the mixing.

Just for this reason technical solutions have been proposed wherein a pressure balancer is positioned as hydraulically connected with the valve inlets of hot and cold water, regardless of the valve being provided or not with thermostatic regulator.

The pressure balancer is designed so as to compensate for pressure changes of the water coming from the water supply system and to prevent, in this way, pressure changes of flow rates of hot water and cold water incoming in the mixer valve.

Generally, the pressure balancer is a stand-alone unit coupling with the mixer valve either directly or by interposing hydraulic connections, thus increasing the overall dimensions and complexity of the assembly.

WO 2014/033678, in the name of the Applicant, describes a solution wherein a pressure balancer can be snap fit and removably constrained to a valve provided with thermostatic regulator, at its lower end, upstream of the inlets for hot water and cold water. The pressure balancer comprises an inner cylindrical volume parted by a plunger in two chambers, into which hot water and cold water is respectively supplied. The plunger feedback moves orthogonally to the valve longitudinal axis, on the basis of the pressures of the two inlet water flows, to compensate for possible pressure transients. The plunger movement causes the volume of one of the two chambers to increase or decrease and, therefore, the volume of the other chamber decreases or increases. Thus, the flow pressures of cold water directed from the pressure balancer to the valve are almost constant over time. In particular, the pressure balancer is arranged orthogonal with respect to the axis of the valve and the associated thermostatic regulator. In other words, the pressure balancer axis, i.e. the axis along which the plunger moves, is orthogonal with respect to the heat sensor axis.

This solution imposes limits on the pressure balancer size, since the associated length dimensions (diameter) could not exceed those of the valve. The volume of the two chambers is thus radially limited; therefore, the inlet volumes of hot water and cold water are also limited.

Other solutions known in the art are described in the International Patent Applications WO 2006/126222 and WO 2007/072526, in the name of the Applicant. In particular the document WO 2006/126222 describes a thermostatic cartridge provided with pressure balancer (reference 16 in FIG. 1) coaxially mounted on the automatic temperature adjusting means, in radially outermost position.

SUMMARY OF THE INVENTION

Therefore, object of the present invention is to provide a mixer valve improved with respect to the known art, in particular a mixer valve provided with a pressure balancer insignificantly affecting the dimensions, still allowing the pressure regulation of large inlet flow rates of water to the same valve.

It is a further object of the present invention to provide a thermostatic mixer valve provided with an integrated pressure balancer.

It is a further object of the present invention to provide a mixer valve provided with an integrated pressure balancer and combined with a flow diverter according to a compact arrangement that minimizes the bulks.

These and other objects are obtained by the mixer tap valve according to claim 1.

In particular the valve comprises:
  a body provided with a longitudinal axis and inlets of cold water and hot water, for example mains water and water from a boiler;
  mixing means to mix cold water with hot water, which are housed in the body or connected to the same,
  a delivery outlet of mixed water, and
  a pressure balancer.

The pressure balancer is housed in the valve body and is fluidically arranged between the inlets of cold water and hot water, and the mixing means. The pressure balancer comprises in turn a cylinder in which two inlet chambers of cold water and hot water are respectively defined, and a movable plunger, which can also be called as piston or diaphragm, inserted in the cylinder. The movable plunger translates in the cylinder in response to a pressure variation of the cold water or hot water, thus correspondingly modifying the volume of one of the two chambers to feedback compensate the pressure variation, which in this way is not transmitted to the mixing means. The mixing is therefore made independent from possible pressure transients of the inlet flow rates of water to the valve.

The pressure balancer is coaxial to the valve body and not transversal thereto.

Advantageously, the pressure balancer is directly and slidingly fitted on a duct, or alternatively on a rod, extending just along the valve longitudinal axis, in radially innermost position with respect to the other components. This allows radially larger dimensions of the valve to be avoided and, at the same time, allows highly accurately processing water flow rates larger than what can be found with the solution described in WO 2014/033678.

As it will be clear by the following description, the valve can be implemented as a simple mixer valve or can also be provided with automatic temperature adjusting means to adjust the temperature of the mixed water. In the first case the afore mentioned duct is a connecting duct that fluidically connects the mixing means with a delivery outlet of the mixed water, in order to allow the delivery of the mixed water outside of the valve; in the second case, in place of the connecting duct, there is an adjusting rod of the automatic temperature adjusting means along the longitudinal axis, and the rod can be operated by the user in order to adjust the temperature of mixed water.

The sliding arrangement of the pressure balancer on the longitudinal duct or rod has not an effect limiting the size of the respective inlet chambers of cold water and hot water. Furthermore, care being taken to accurately design the valve, the advantages of the proposed solution can be obtained without even affecting the axial dimensions, thus length being equal with respect to known solutions.

Other features of the valve are described in the dependent claims 1-12.

Generally, the valve can be provided with mixing means and/or temperature adjusting means, and/or diverting means to divert the mixed water to several users.

LIST OF THE FIGURES

Further characteristics and advantages of the invention will be better highlighted by the review of the following specification of a preferred, but not exclusive, embodiment illustrated for illustration purposes only and without limitation, with the aid of the accompanying drawings, wherein.

DETAILED DESCRIPTION OF THE INVENTION

In the figures, like or equivalent pieces or components, even if belonging to different embodiments, are denoted by the same numbers.

Figures 1, 2:
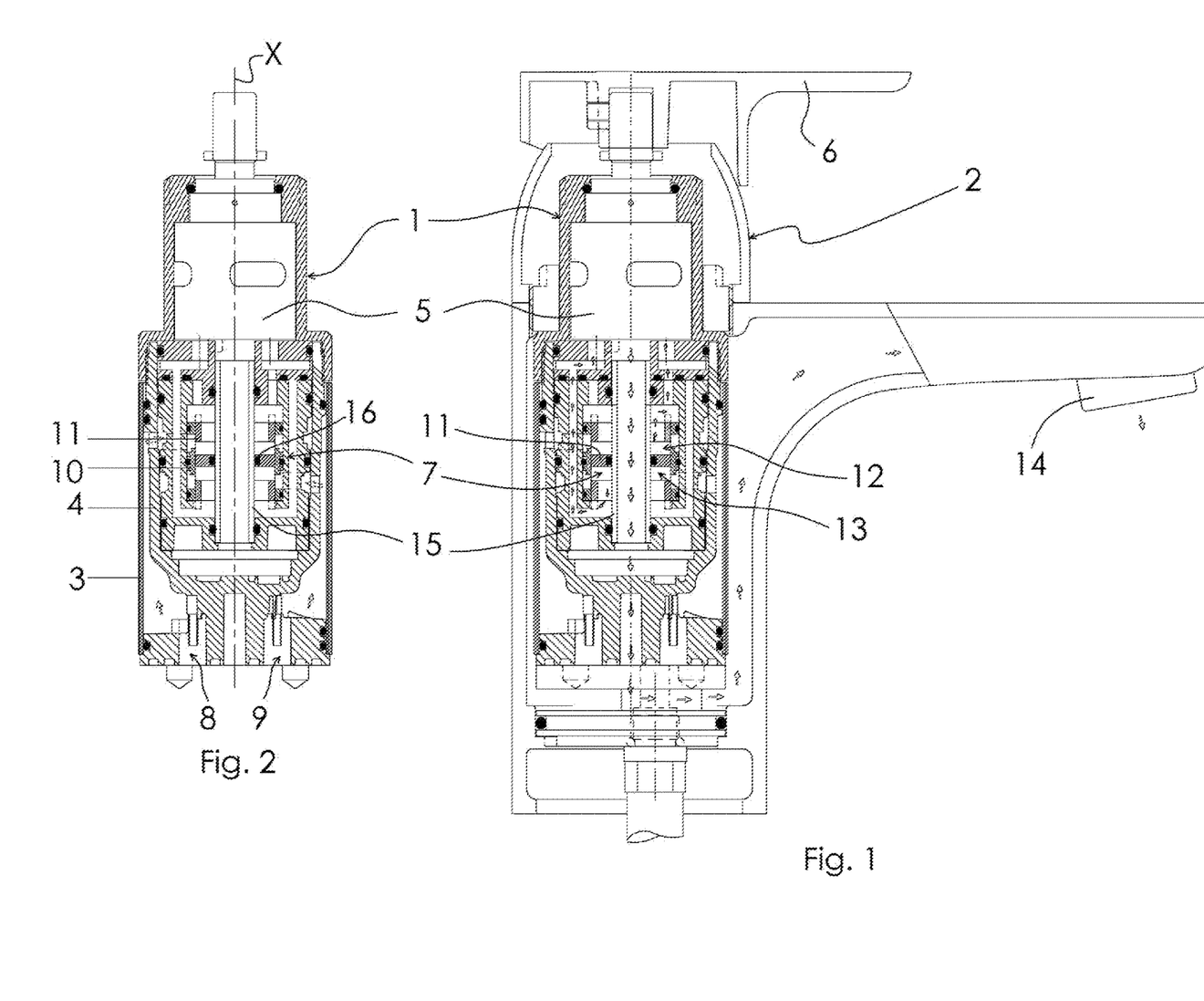
FIG. 1 is a vertical (longitudinal) sectional view of a first embodiment of the mixer valve according to the present invention, inserted in a mixer tap.
FIG. 2 is a vertical sectional view of the only mixer valve shown in FIG. 1.

FIGS. 1 and 2 relate to a first embodiment of the mixer valve 1 according to the present invention. Specifically, the valve 1 in FIG. 1 is operatively inserted in a sink tap 2, whereas FIG. 2 shows the valve 1 as separate.

The mixer valve 1 comprises a plurality of elements sandwiched one on another and enclosed in a casing or sleeve 3. In particular it comprises a first substantially cup-shaped lower element 4, hereinafter named distributing body, and a mixer cartridge 5, for example having 25 mm diameter, positioned above the distributing body 4 and operable by the user by means of the lever 6 in order to obtain the desired mixing of the flow rates of hot water and cold water.

Inside the distributing body 4 a pressure balancer 7 is sealingly housed with the function of feedback continuously balancing the flow rates of hot water and cold water, on the basis of the respective pressures. The pressure of each inlet flow rate to the valve 1 is the mains one and can vary over time.

The pressure balancer 7 thus allows the best mixing by the mixer cartridge 5 to be obtained, regardless of potential pressure transients of the inlet flows of hot water and cold water to the mixer valve 1.

In particular, the balancer 7 is fluidically arranged between the inlets 8 and 9 of hot water and cold water and the mixer cartridge 5.

The balancer 7 comprises a cylinder 10 in which two inlet chambers 12, 13 of cold water and hot water are defined, which are separated by a circular-shaped movable plunger 11, which can also be called piston or diaphragm. When a pressure variation (increase or decrease) occurs in one of the two inlet flows, the plunger 11 moves correspondingly modifying the volume of one of the two chambers 12, 13 in order to compensate for the pressure variation, which is not transmitted to the flows sent to the mixer cartridge 5.

In FIG. 1 the flows of hot water and cold water directed towards the mixer cartridge 5 and from the latter towards the nozzle 14 are denoted by corresponding arrows.

Advantageously, the movable plunger 11 moves along the longitudinal axis X of the valve 1, and not orthogonally as in the known art. In other words, the pressure balancer 7 is coaxial to the same valve 1.

In order to allow the passage of mixed water flowing out from the mixer cartridge 5 and directed towards the nozzle 14, a proper connecting duct 15 is provided, which just develops along the longitudinal axis X of the valve 1, on which the movable plunger 11 can slide.

An O-ring type gasket 16 ensures the plunger sealing on the connecting duct 15.

The axial arrangement of the pressure balancer 7 allows the limits of conventional solutions to be overcome: the chambers 12 and 13 can have large volume, by having the height gap available and at the same time the valve is compact, meaning that the presence of the balancer 7 does not affect the radial dimensions, which are the most critical for the industry due to diameter standardization.

Figure 3:
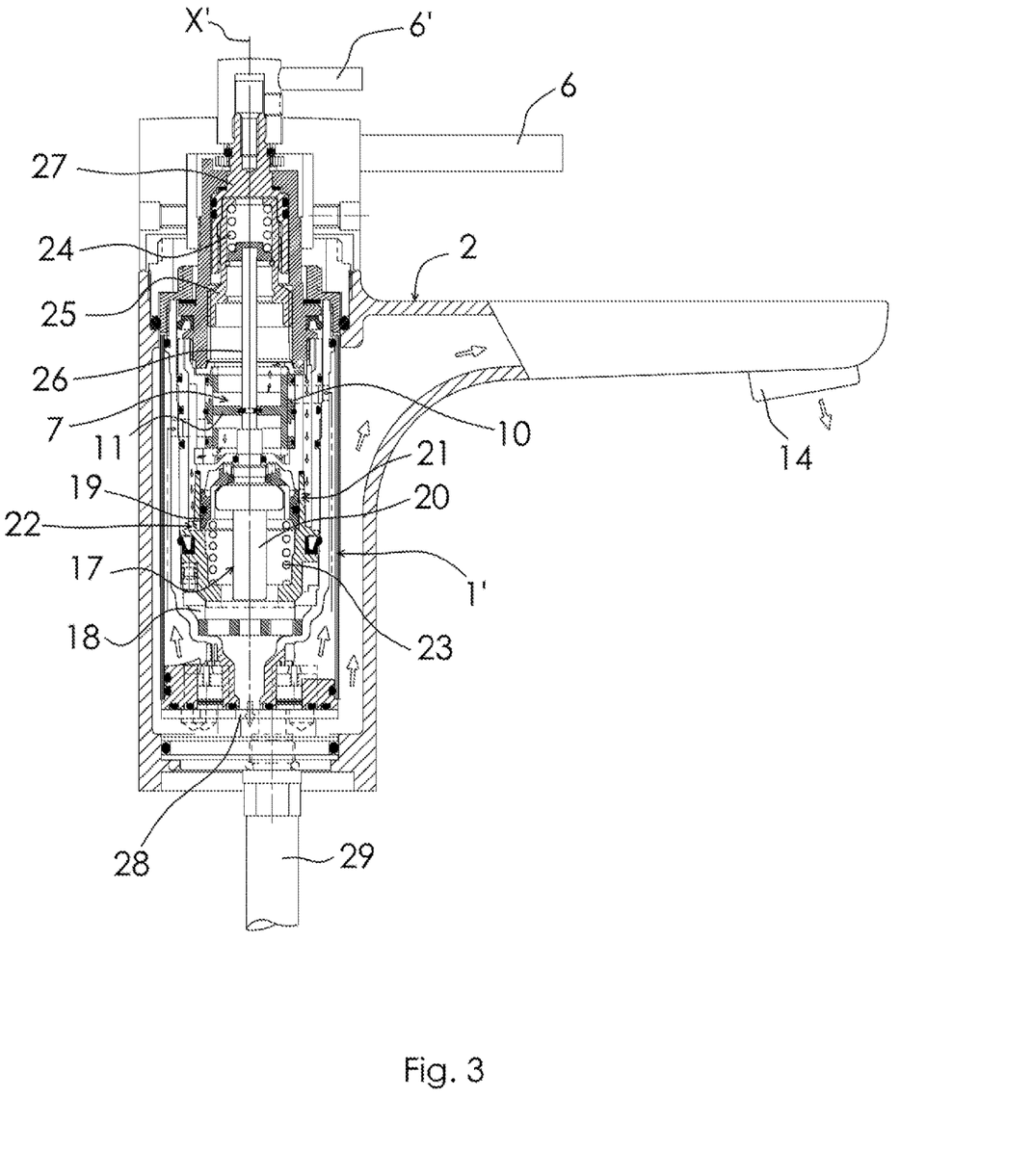
FIG. 3 is a vertical sectional view of a second embodiment of the mixer valve still according to the present invention, inserted in a mixer tap.

FIG. 3 shows a second embodiment 1' of the valve according to the present invention, operatively mounted in a tap 2. With respect to the just described valve 1, this variation 1' is differentiated by having, in addition to the pressure balancer 7, a temperature regulator 17 also, as it will be now described.

Inside the distributing body 4 a mixing chamber 18 is defined in which an element 19 is housed, hereinafter called piston, having the function of regulating the flow rates of the inlet flows of hot water and cold water to the mixing chamber 18 to adjust the temperature of the delivered mixed water.

The piston 19 is coupled, in a known way, to a thermostatic bulb 20 and is capable of axial movements in response to temperature changes the thermostatic bulb 20 is subjected to, due to changes in pressure and/or flow rate and/or temperature of the inlet flows of hot water and cold water to the mixer valve 1.

The temperature changes occurring in the thermostatic bulb 20 cause the latter to expand; the bulb 20 is in contact with the water flowing through the mixing chamber 18 and is affected by its temperature and, expanding in different ways depending on the water temperature, it controls the movements of the piston 19.

The piston 19, because of its axial movement, intercepts completely or partially, and selectively, the openings 21 and 22 obtained through the distributing body 4 for regulating, correspondingly, the flow rates of hot water and cold water respectively supplied just to the openings 21 and 22 and directed to the mixing chamber 18.

In the section shown in FIG. 3 the piston 19 is in its completely lowered position, and closes the inlet 22 of hot water.

The vertical movements of the piston 19 are countered by two different opposed lower and upper springs 23 and 24 respectively interposed between the same piston 19 and the distributing body 4 and between a cap 25 resting on the top of an adjusting rod 26 of the thermostatic bulb 20 and a bushing 27 connected to a control lever 6' of the thermostatic regulator 17.

The temperature of the mixed water is set by the user acting on the lever 6' connected to the thermostatic bulb 20 by means of the adjusting rod 26.

Therefore, the temperature of mixed water in the mixing chamber 18 is feedback adjusted in response to the expansions the thermostatic bulb 20 is subjected to, in order to remain almost constant over time.

In other words, in response to the expansions of the thermostatic bulb 20, the piston 19 moves to a precise position within its available stroke, at which it intercepts completely, partially, or not at all, the inflowing openings 21 and 22 of cold water and hot water, respectively.

By the numeral reference 28 the opening is denoted which is obtained through the distributing body 4 for the discharge of the mixed water outside of the mixer valve 1', towards the nozzle 14 of the tap.

The flows of hot water and cold water reach the inlet passages 21, 22 through ducts (only one can be seen in figure, with the numeral reference 29) connected to the body of tap 2.

Advantageously, in this version the pressure balancer 7 also is operative along the longitudinal axis X' of the valve 1'. The components of the pressure balancer 7 are the same as those described for the first embodiment shown in FIGS. 1 and 2, except that the rod 26 replaces the duct 15. In other words, the movable plunger 11 can slide on the rod 26 extending from the bulb 20 and is coaxial to the same.

Figure 4:
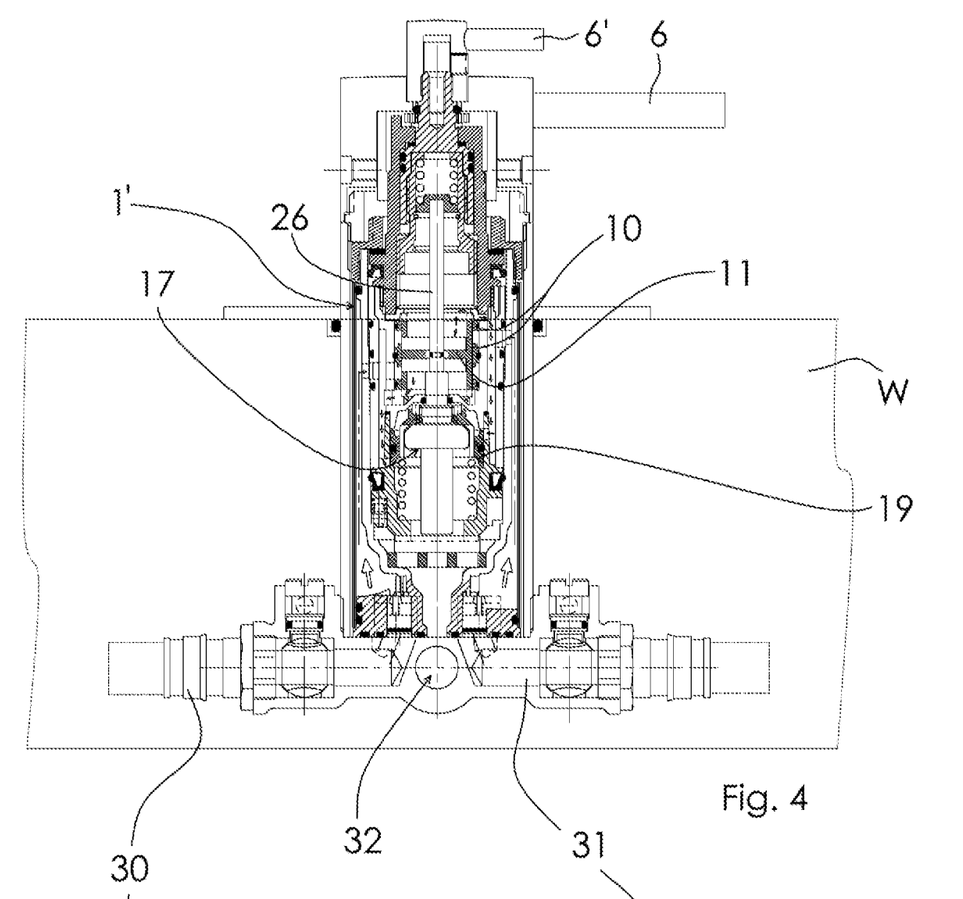
FIG. 4 is a longitudinal sectional view of the second embodiment of the mixer valve according to the present invention, inserted in a wall.
Figure 5:
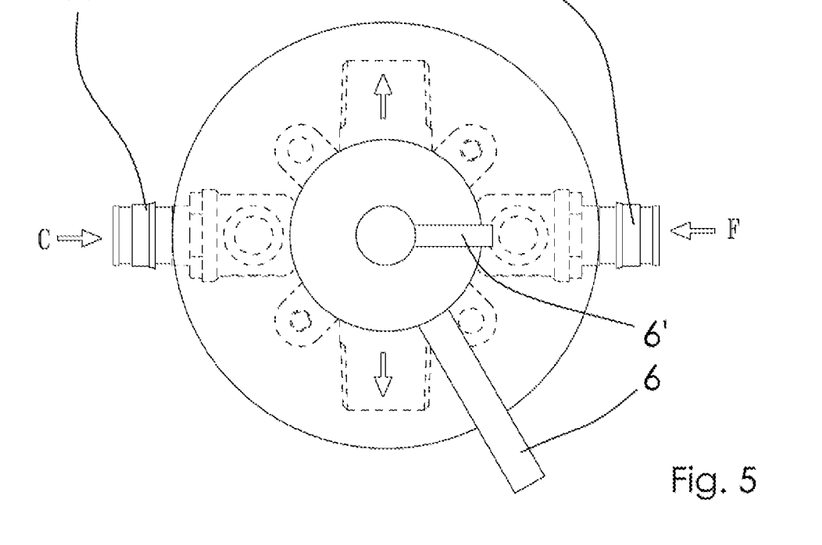
FIG. 5 is a front view of the valve shown in FIG. 4.

FIGS. 4 and 5 show the valve 1' embedded in a wall W, for example the wall of a shower. With the referrals 30 and 31, the inflow lines of hot water C and cold water F are respectively denoted. By acting on the lever 6' the user adjusts the temperature of the mixed water; substantially the user acts on the temperature regulator 17. By acting on the lever 6 the user adjusts the flow rate of the mixed water leaving the valve 1' from a lower duct 32, denoted by the outgoing arrows in FIG. 5.

Figures 6, 7:
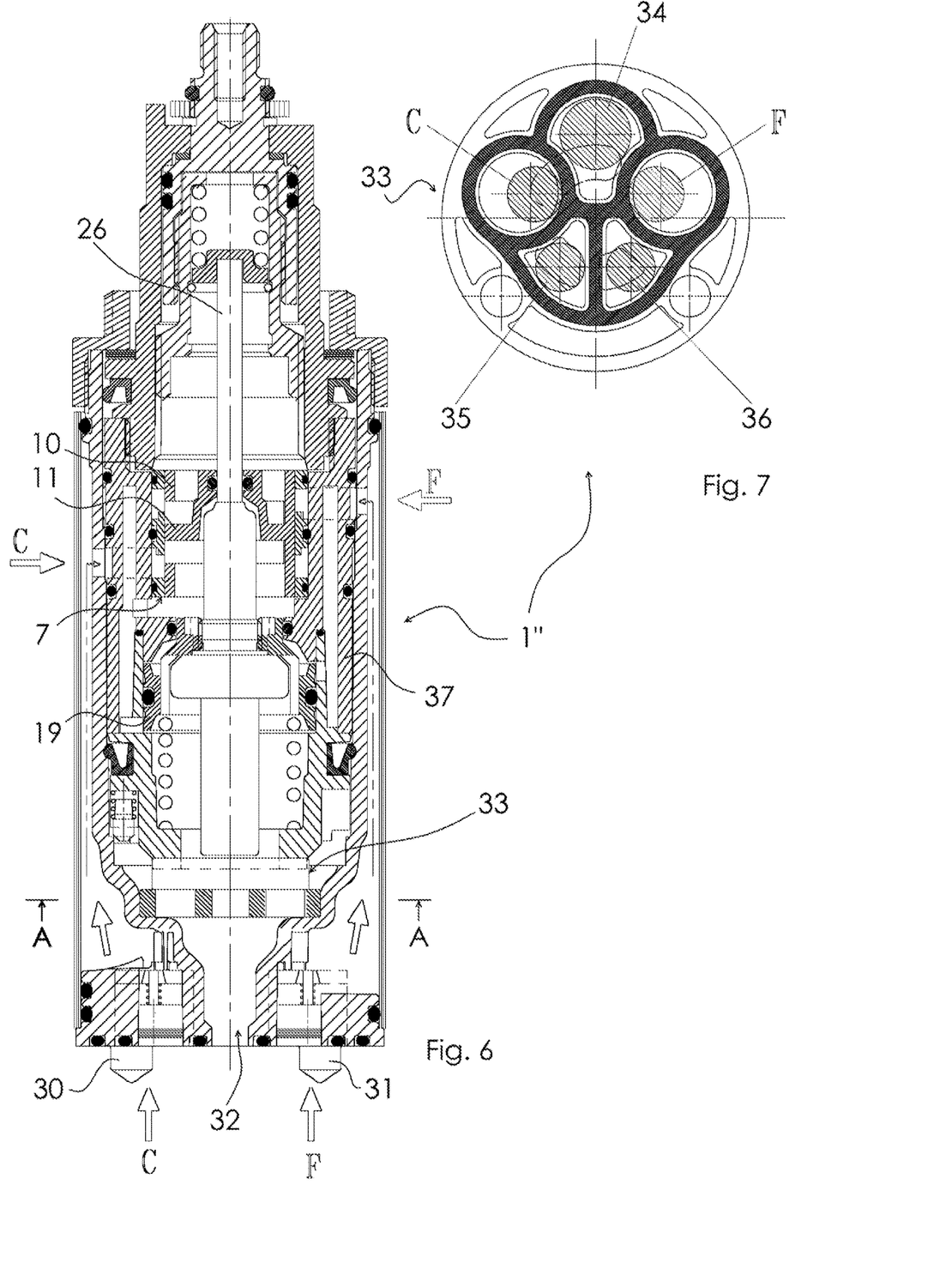
FIG. 6 is a longitudinal sectional view of a third embodiment of the mixer valve according to the present invention.
FIG. 7 is a transverse sectional view of the valve shown in FIG. 6, taken along the plane A-A.

FIGS. 6 and 7 show a third embodiment 1" of the valve according to the present invention, not installed in a tap or wall, but considered individually. The levers 6 and 6' are not drawn for further clarity. The valve 1" is provided with water turning off, regulating and/or distributing system of the type with ceramic plates 33, such as those usually employed in the two- or multi-ways diverters.

As shown in FIGS. 6 and 7, such a system preferably consists of a fixed plate and a movable plate which is rested and rotatable over the fixed one. The plates are generically denoted by the number 33 and are provided with through holes that can be brought in alignment by the user acting on a proper control. The two plates coaxially intercept the discharge opening 32 of the valve 1", in order to allow obtaining, in addition to the total closing of the same opening 32, the diversion also of the mixed water to three different users, such as for example a bath tub, a shower, a hand-held shower head, selectively or contemporaneously.

FIG. 7 shows in detail the plate set 33 and the respective arrangement with respect to the inlets of hot water C and cold water F. In particular it is a sectional view taken along the A-A plane of FIG. 6. The plates 33 adjust the flow of mixed water towards the three outlets 34, 35 and 36.

Figure 9:
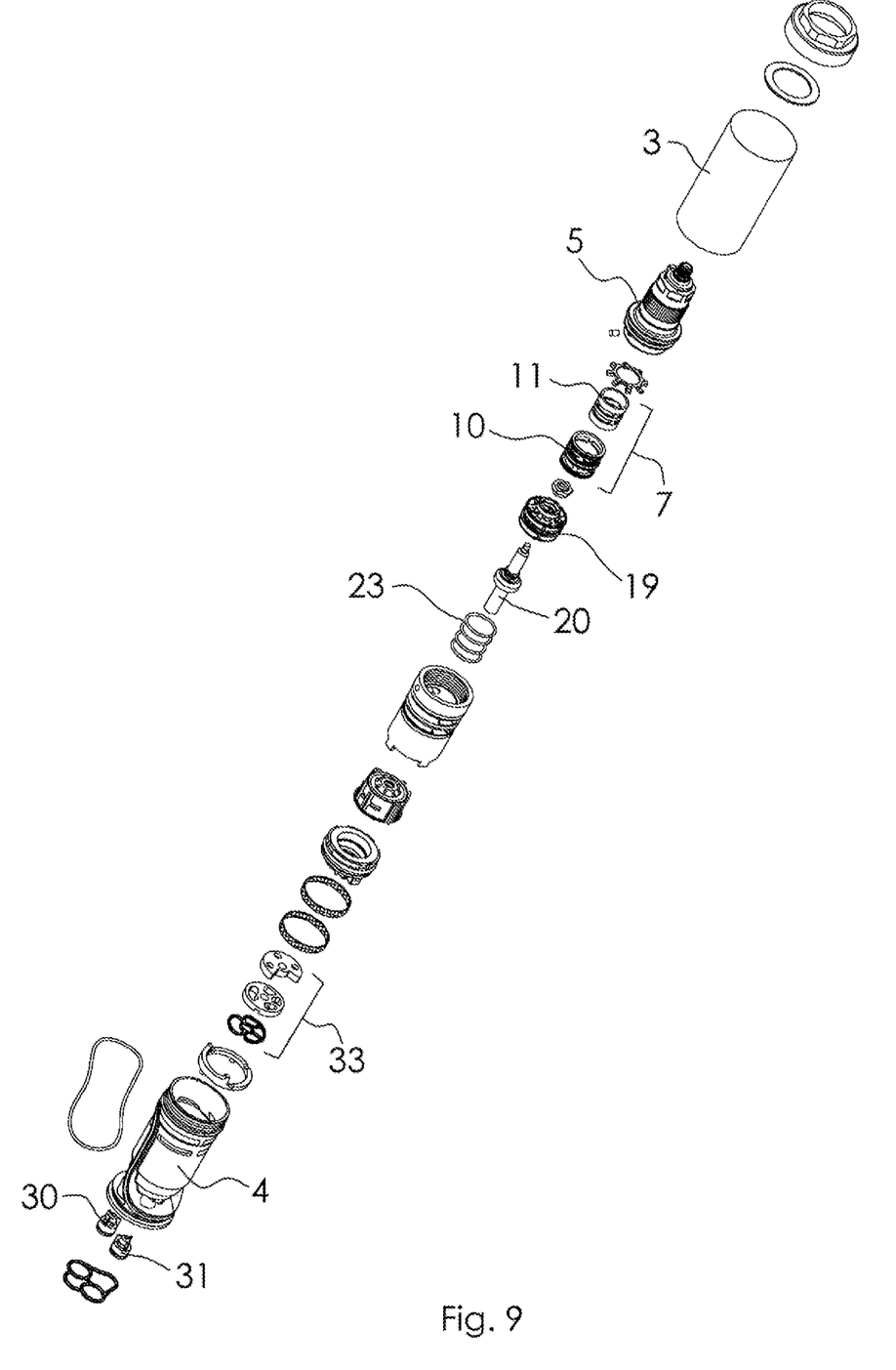
FIG. 9 is a perspective and exploded view of the mixer valve shown in FIG. 6.

The plates 33 can also be seen individually in FIG. 9.

Figure 8:
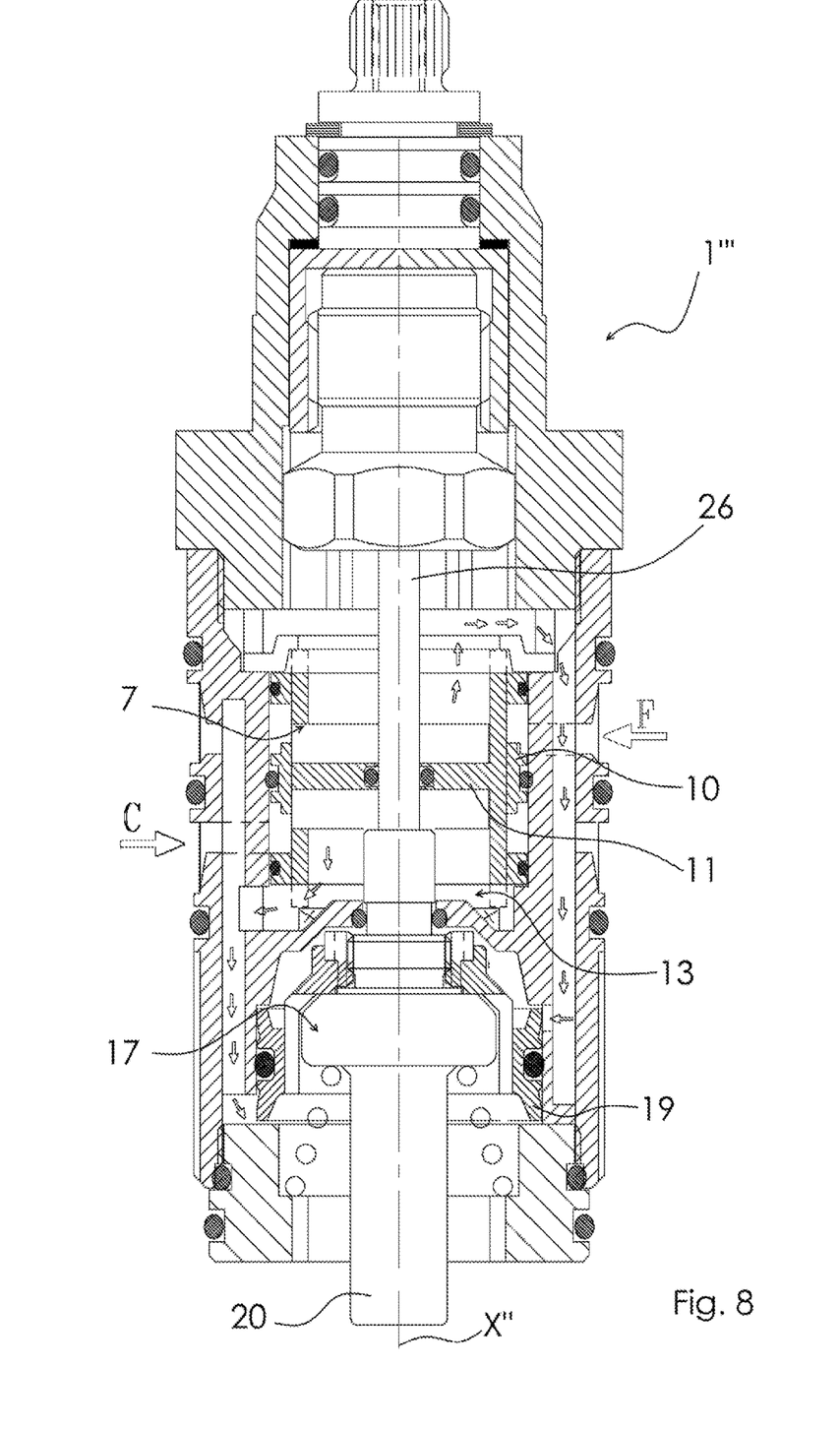
FIG. 8 is a longitudinal sectional view of a fourth embodiment of the mixer valve according to the present invention.

FIG. 8 shows a fourth embodiment 1'" of the valve according to the present invention, not installed in a tap or wall but taken individually. It is a valve with temperature regulator 17 and coaxial pressure balancer 7, i.e. operative along the longitudinal axis X" of the valve 1'". The plunger 11 of the pressure balancer 7 can axially slide along the rod 26 extending from the bulb 20.

FIG. 9 is an exploded view of the mixer valve 1" shown in FIG. 6 wherein all the components are individually shown as aligned along the longitudinal axis of the valve 1".

Figure 10:
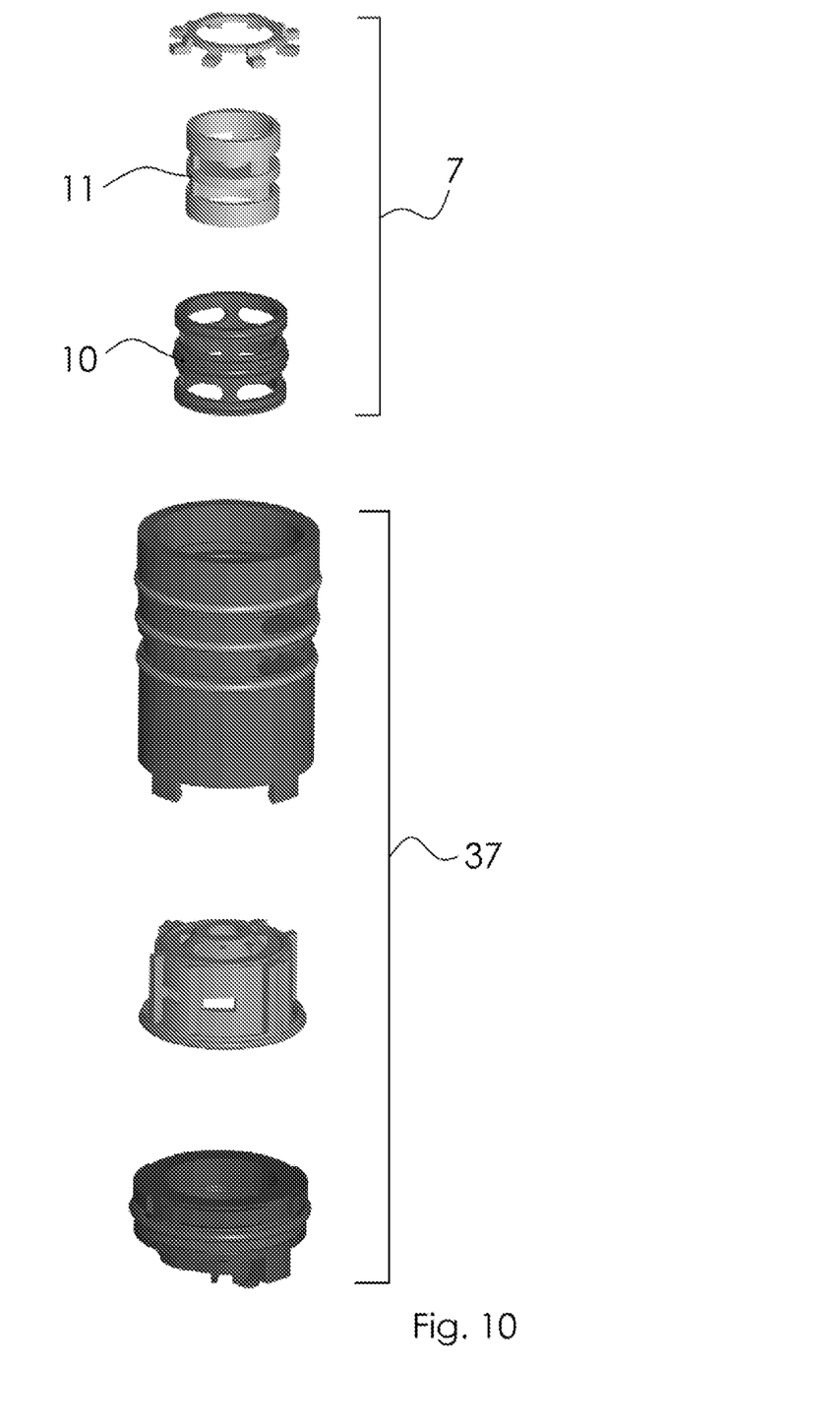
FIG. 10 is a perspective and exploded view of some components of the mixer valve shown in FIG. 6.

FIG. 10 is an exploded and perspective view of a set of components of the valve 1". In particular the pressure balancer 7 and a set of elements are shown and overall denoted with the numeral reference 37, named towing body, in which the temperature regulator 17 is housed.

Preferably in all the embodiments 1, 1', 1", 1'" of the valve, the movable plunger 11 of the pressure balancer 7 is provided with at least one gasket 16 of O-ring type for the sealing against the duct 15 or rod 26 of the temperature regulator 17.

Figures 11, 12, 13, 14:
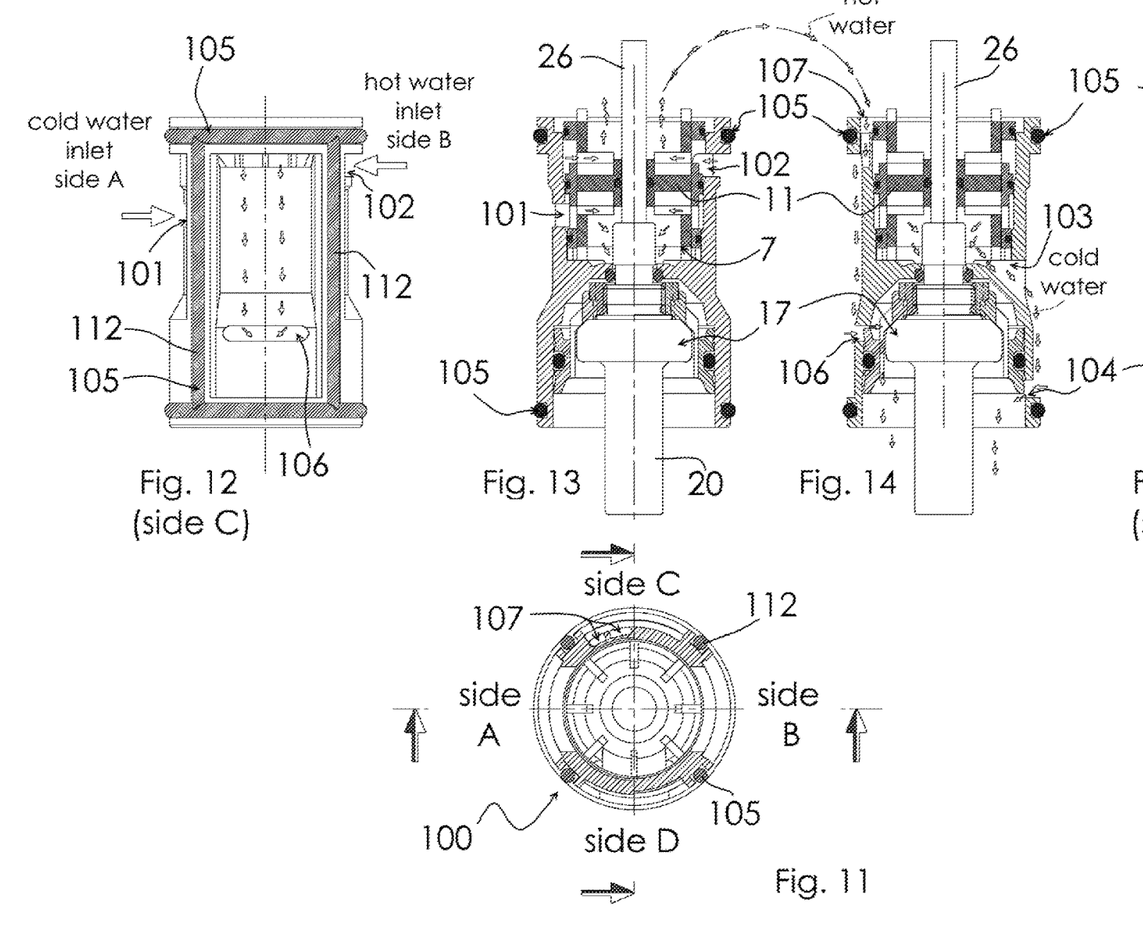
FIG. 11 is a top view of a fifth embodiment of the mixer valve according to the present invention.
FIG. 12 is an elevation view of the side A of the mixer valve shown in FIG. 11.
FIG. 13 is a vertical sectional view, taken along a plane passing through the longitudinal axis and intersecting the sides A and B of the mixer valve shown in FIG. 11.
FIG. 14 is a vertical sectional view, taken along a plane passing through the longitudinal axis and intersecting the sides C and D of the mixer valve shown in FIG. 11.

FIG. 11 shows a fifth embodiment 100 of the valve according to the present invention, not installed in a tap or a wall, but taken individually. FIGS. 12-15 relate to the same valve 100.

In order to make the following description more comprehensible, even if the valve 100 has substantially circular section, it has been divided in four sides A-D by a cage-shaped gasket 105. In practice, by cooperating with the body 4 (not shown for simplicity) of the valve 100, the cage-shaped gasket 105, which can be seen throughout the FIGS. 11-15, keeps the sides A-D fluidically isolated one from another.

It is a valve with temperature regulator 17 and coaxial pressure balancer 7, i.e. operative along the longitudinal axis of the valve 100. The plunger 11 of the pressure balancer 7 can axially slide along the rod 26 extending from the bulb 20.

On the side A there is the inlet opening 101 of the cold water coming from the mains and on the side B there is the inlet opening 102 for the hot water. The arrows in FIG. 12 show the openings 101 and 102 from the outside; the same openings 101, 102 can be seen in section in FIG. 13. The two flows of cold and hot water reach the pressure balancer 7 from opposite sides with respect to the plunger 11. As described above the plunger 11, by moving along the control lever 26 of the temperature adjusting means 17, provides for balancing the pressure between the two flows.

Figure 15:
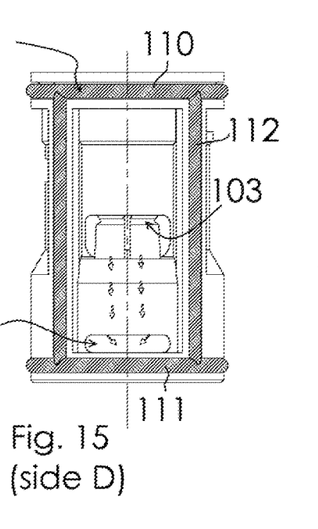
FIG. 15 is an elevation view of the side D of the mixer valve shown in FIG. 11.

The arrows drawn in FIGS. 13, 14 and 15 show the paths of the two outlet flows of cold water and hot water from the pressure balancer 7, which are directed towards the automatic temperature adjustment means 17. As it can be noted, the cold water directly passes from the pressure balancer 7 to the automatic temperature adjusting means 17, by flowing out through the side opening 103 and flowing in through the side opening 104.

The cage-shaped gasket 105 keeps the flow path of the cold water isolated with respect to the flow path of hot water. In practice, the cage-shaped gasket 105 isolates four circular sectors of the valve 100, one from another, by cooperating with the body 4, and each side A-D corresponds to one of such circular sectors.

Hot water flows out on top from the pressure balancer 7, re-enters through the openings 107, flows sideways along the side C of the valve 100, as can be seen in FIG. 12, and reaches the automatic temperature adjusting means 17 by passing through the opening 106.

As shown in FIG. 15, the cage-shaped gasket 105 comprises an upper O-ring 110 intended for horizontally encircling the upper part of the valve 100, a lower O-ring 111 intended for horizontally encircling the lower part of the valve 100, and four straight portions 112 vertically extending and connecting the two O-rings 110, 111 by acting on the side surface of the valve 100. As it can be seen in FIG. 11, the four straight portions 112 of the cage-shaped gasket 105 keep the four circular sectors isolated, one per each of the four sides A-D.

The invention claimed is:

1. A valve (1, 1', 1", 1''') for mixer taps, which comprises: a body (4) provided with a longitudinal axis (X) and inlets (8, 9, 29, 30, 31) of cold water (F) and hot water (C); mixing means (5) to mix cold water (F) with hot water (C), housed in the body (4) or connected thereto, a delivery outlet (28, 32) of mixed water, a duct (15) or rod (26) extending along the longitudinal axis (X), a pressure balancer (7), housed in the body (4) and fluidically arranged between the inlets (8, 9, 29, 30, 31) of cold water (F) and hot water (C) and the mixing means (5), wherein the pressure balancer (7) in turn comprises a cylinder (10) in which two inlet chambers (12, 13) of cold water (F) and hot water (C) are respectively defined, and a movable plunger (11) inserted in the cylinder (10), wherein the movable plunger (11) moves in the cylinder (10) in response to a pressure variation of cold water (F) or hot water (C), thus correspondingly modifying the volume of one of the two chambers (12, 13) to feedback compensate the pressure variation, which is not transmitted to the mixing means (5), wherein the pressure balancer (7) is coaxial to the body (4) of the valve (1, 1', 1", 1'''), and the movable plunger (11) is slidingly fitted on said duct (15) or rod (26).

2. The valve (1, 1', 1", 1''') according to claim 1, wherein a translation axis of the movable plunger (11) in the cylinder (10) is the longitudinal axis (X).

3. The Valve (1, 1', 1", 1''') according to claim 1, wherein the mixing means (5) are also coaxial to the body (4) of the valve (1, 1', 1", 1''').

4. The valve (1, 1', 1", 1''') according to claim 1, wherein the delivery outlet (28, 32) of mixed water is on the longitudinal axis (X).

5. The Valve (1, 1', 1", 1''') according to claim 1, wherein the mixing means (5) consist of a mixer cartridge.

6. The Valve (1, 1', 1", 1''') according to claim 1, wherein the duct (15) is a connecting duct that fluidically connects the mixing means (5) with a delivery outlet (28, 32) of mixed water, to allow the delivery of mixed water outside of the valve (1, 1', 1", 1''').

7. The valve (1, 1', 1", 1''') according to claim 1, further comprising automatic temperature adjusting means (17) to automatically adjust the temperature of the mixed water.

8. The valve (1, 1', 1", 1''') according to claim 7, wherein the automatic temperature adjusting means (17) are coaxial to the body (4) of the valve (1, 1', 1", 1''').

9. The valve (1, 1', 1", 1''') according to claim 7, wherein the automatic temperature adjusting means (17) are internally provided with a water mixing chamber (18); and further comprises:
   side openings (21, 22), provided at different heights with respect to the longitudinal axis (X), for the inflow of hot water (C) and cold water (F) separately in said mixing chamber (18), both coming from the pressure balancer (7); and
   a thermostatic bulb (20) operating in said mixing chamber (18) and an element (19) for regulating the flow rates of hot water (C) and cold water (F), which is movable along the longitudinal axis (X) in order to feedback close completely or partially, and selectively, said side openings (21, 22) for the inflow, depending on expansions to which the thermostatic bulb (20) is subjected.

10. The Valve (1, 1', 1", 1''') according to claim 7, further comprising a water shut off, regulating and/or distributing system (33), positioned between the mixing means (5), or the automatic temperature adjusting means (17), and the delivery outlet (28, 32) of mixed water, to divert the flow of mixed water selectively or contemporaneously to several users connected to the delivery outlet (28, 32) or to intercept the flow of mixed water completely.

11. The valve (100) according to claim 7, wherein the inlets (101, 102) of cold water and hot water towards the pressure balancer (7) and the openings (103, 104, 106, 107) for distributing the flows of cold water and hot water towards the automatic temperature adjusting means (17), are arranged at the sides (A-D) of the body (4) of the valve, and the flow paths of cold water (F) and hot water (C) between the inlets (101, 102) and the openings (103, 104, 106, 107) are kept isolated by a single main gasket (105).

12. The valve (100) according to claim 11, wherein said main gasket (105) comprises a circular and horizontal upper portion (110), of the O-ring type, configured to encircle the top of the body (4) of the valve (100), a circular and horizontal lower portion (111), of the O-ring type, configured to encircle the base of the body (4) of the valve (100), and four straight portions (112) vertically connecting the two upper (110) and lower (111) portions and cooperating with the body (4) of the valve (100) in order to isolate, one from another, four circular sectors of the valve (100), one per each of the four sides (A-D).

13. The valve (1, 1', 1", 1''') according to claim 1, further comprising automatic temperature adjusting means (17) of the mixed water, wherein said rod (26) is an adjusting rod of the automatic temperature adjusting means (17) that extends outside of the valve and can be operated by a user in order to adjust the temperature of the mixed water.

14. The valve (1, 1', 1", 1''') according to claim 1, wherein the movable plunger (11) is toroidal and provided with an O-ring gasket at the central hole, to seal against the surface on which the movable plunger (11) translates.

\* \* \* \* \*